(12) United States Patent
Ornan et al.

(10) Patent No.: US 11,427,328 B2
(45) Date of Patent: Aug. 30, 2022

(54) SEAT INDEXING SYSTEMS AND METHODS (71) Applicant: THE BOEING COMPANY, Chicago, IL (US)

(72) Inventors: Rachelle N. Ornan, Seattle, WA (US); Mark L. Cloud, Seattle, WA (US); Raymond Roeder, Seattle, WA (US); Dean Hettick, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 444 days.

(21) Appl. No.: 16/529,935

(22) Filed: Aug. 2, 2019

(65) Prior Publication Data

US 2020/0307809 A1   Oct. 1, 2020

Related U.S. Application Data (60) Provisional application No. 62/825,855, filed on Mar. 29, 2019.

(51) Int. Cl.
*B64D 11/06* (2006.01)

(52) U.S. Cl.
CPC ...... *B64D 11/0696* (2013.01); *B64D 11/0648* (2014.12)

(58) Field of Classification Search
CPC . B64D 11/0696; B64D 11/06; B64D 11/0648; B64N 2/02; B60N 2002/0212
USPC .............. 248/424, 157, 429–430; 296/65.13, 296/65.14
See application file for complete search history.

(56) References Cited

U.S. PATENT DOCUMENTS

| 4,723,732 | A | * | 2/1988 | Gorges | ............... B64D 11/0696 |
| | | | | | 105/127 |
| 4,856,738 | A | * | 8/1989 | Martin | ............... B64D 11/0696 |
| | | | | | 410/105 |
| 5,178,346 | A | * | 1/1993 | Beroth | .................. B64D 9/003 |
| | | | | | 244/118.1 |
| 7,713,009 | B2 | | 5/2010 | Hudson | |
| 7,785,053 | B2 | | 8/2010 | Hudson | |
| 8,128,326 | B2 | | 3/2012 | Hudson | |
| 8,920,085 | B2 | | 12/2014 | Hudson | |
| 9,567,086 | B2 | | 2/2017 | Siegmeth | |

(Continued)

FOREIGN PATENT DOCUMENTS

| EP | 0282244 | 9/1988 |
| EP | 463757 | 1/1992 |

(Continued)

OTHER PUBLICATIONS

U.S. Appl. No. 16/365,788, filed Mar. 27, 2019.

(Continued)

*Primary Examiner* — Joshua D Huson
*Assistant Examiner* — Shanna Danielle Glover
(74) *Attorney, Agent, or Firm* — The Small Patent Law Group LLC; Joseph M Butscher (57) ABSTRACT

A seat indexing system and method for an internal cabin of a vehicle include a seat assembly, and an indexing wheel coupled to the seat assembly. The indexing wheel is configured to be moved between a stowed position, in which the indexing wheel is disengaged from a seat track, and a deployed position, in which the indexing wheel engages the seat track.

20 Claims, 7 Drawing Sheets

(56) References Cited

U.S. PATENT DOCUMENTS

2011/0309195 A1* 12/2011 Bishop .............. B64D 11/0696
                                                                  244/118.6
2014/0239689 A1* 8/2014 Schebaum ............... B60N 2/08
                                                                  297/341
2017/0181308 A1* 6/2017 Swatko ................ H05K 7/1412

FOREIGN PATENT DOCUMENTS

| | | |
|---|---|---|
| GB | 608366 | 6/1939 |
| GB | 2406877 | 4/2005 |
| GB | 2426549 | 11/2006 |
| GB | 2477100 | 7/2011 |
| JP | 2279433 | 11/1990 |

OTHER PUBLICATIONS

U.S. Appl. No. 16/365,777, filed Mar. 27, 2019.
U.S. Appl. No. 16/529,921, filed Aug. 2, 2019.
U.S. Appl. No. 16/671,226, filed Nov. 1, 2019.
U.S. Appl. No. 16/529,946, filed Aug. 2, 2019.
U.S. Appl. No. 16/529,957, filed Aug. 2, 2019.
U.S. Appl. No. 16/368,925, filed Mar. 29, 2019.
U.S. Appl. No. 16/367,314, filed Mar. 28, 2019.
U.S. Appl. No. 16/368,934, filed Mar. 29, 2019.
U.S. Appl. No. 16/671,238, filed Nov. 1, 2019.
Extended European Search Report dated Aug. 14, 2020 relating to application No. 20166479.4.

* cited by examiner

SEAT INDEXING SYSTEMS AND METHODS

RELATED APPLICATIONS

This application relates to and claims priority benefits from U.S. Provisional Patent Application No. 62/825,855, entitled "Seat Indexing Systems and Methods," filed Mar. 29, 2019, which is hereby incorporated by reference in its entirety.

FIELD OF EMBODIMENTS OF THE DISCLOSURE

Embodiments of the present disclosure generally relate to seat indexing systems and methods, and more particularly, to seat indexing systems and methods that allow for efficient and reliable positioning of seats within an internal cabin of a vehicle.

BACKGROUND OF THE DISCLOSURE

Commercial aircraft typically include an internal cabin that may be divided into numerous sections. A cockpit is generally separated from a passenger cabin, which may include a first class section, a business class section, an economy section, and the like. Each section within a passenger cabin may have a different spacing or pitch between rows of seats. For example, a first class section typically has a greater pitch between rows of seats as compared to an economy section.

As a commercial aircraft is being manufactured, passenger seats are secured within an internal cabin. Because a commercial aircraft may include different sections having different pitches between rows of seats, the process of positioning and securing seats at defined positions within an internal cabin is time and labor intensive. For example, in order to position a seat at a desired location within an internal cabin, an individual typically first measures a distance from a particular location to the define location for the seat.

Additionally, after the aircraft is manufactured and is in service, between flights of the aircraft, an operator may decide to reconfigure certain seating areas to adjust the pitch between certain rows of seats. For example, an operator may decide to change a row of an economy section into an economy plus section, or vice versa. The pitch between rows of the economy section may differ from the pitch between rows of the economy plus section. When the seats are reconfigured, care it taken to ensure that the seats are located at proper positions.

As noted, the process of properly positioning seats within an internal cabin is time and labor intensive. If one or more seats are positioned at even slightly different positions than preferred, defined locations, one or more sections within a commercial aircraft may be affected, in that spacing between different certain rows may not be as intended. Further, if there is a relatively short time until a subsequent flight, there may not be sufficient time to adjust the seats to new positions.

SUMMARY OF THE DISCLOSURE

A need exists for an efficient system and method for identifying proper locations for seats within an internal cabin of a vehicle. Further, a need exists for a system and method that allow for quick and efficient adjustment of seats within an internal cabin.

With those needs in mind, certain embodiments of the present disclosure provide a seat indexing system for an internal cabin of a vehicle. The seat indexing system includes a seat assembly, and an indexing wheel coupled to the seat assembly. The indexing wheel is configured to be moved between a stowed position, in which the indexing wheel is disengaged from a seat track, and a deployed position, in which the indexing wheel engages the seat track. The indexing wheel is configured to roll over a portion of the seat track to identify a proper position for the seat assembly in relation to the seat track.

The indexing wheel may couple to the seat assembly through an extension arm that is pivotally connected to the seat assembly by a pivot axle.

In at least one embodiment, the indexing wheel includes a wheel body, a first stop radially extending from the wheel body, and a second stop radially extending from the wheel body. A rolling range of the indexing wheel is defined between the first stop and the second stop. The rolling range relates to a traversed area over the seat track defining a proper position for the seat assembly.

In at least one embodiment, the indexing wheel includes a plurality of knobs radially extending from a wheel body. The plurality of knobs are radially spaced to fit into expanded openings of the seat track as the indexing wheel rolls over the seat track. In at least one embodiment, an audible click is emitted as each of the plurality of knobs passes into or out of one of the expanded openings. The plurality of knobs define a positioning range, which relates to a traversed area over the seat track defining a proper position for the seat assembly. The indexing wheel may also include a smooth rim outside of the positioning range.

Certain embodiments of the present disclosure provide a seat indexing method that includes coupling an indexing wheel to a seat assembly, and selectively moving, the indexing wheel between a stowed position, in which the indexing wheel is disengaged from a seat track, and a deployed position, in which the indexing wheel engages the seat track. The seat indexing method also includes rolling the indexing wheel over a portion of the seat track to identify a proper position for the seat assembly in relation to the seat track.

The coupling may include coupling the indexing wheel to the seat assembly through an extension arm that is pivotally connected to the seat assembly by a pivot axle.

In at least one embodiment, the seat indexing method includes providing the indexing wheel with a first stop and a second stop that radially extend from a wheel body. The seat indexing method may also include defining a rolling range of the indexing wheel between the first stop and the second stop. The seat indexing method may also include relating the rolling range to a traversed area over the seat track defining a proper position for the seat assembly.

In at least one embodiment, the seat indexing method includes providing the indexing wheel with a plurality of knobs that radially extend from a wheel body, wherein the plurality of knobs are radially spaced to fit into expanded openings of the seat track as the indexing wheel rolls over the seat track. The seat indexing method may also include emitting an audible click as each of the plurality of knobs passes into or out of one of the expanded openings. The seat indexing method may also include defining a positioning range with the plurality of knobs. The seat indexing method may also include providing a smooth rim outside of the positioning range.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide seat indexing systems and methods that include an indexing wheel coupled to a seat assembly. The indexing wheel is configured to be moved between a stowed position, in which the indexing wheel is disengaged from a seat track, and a deployed position, in which the indexing wheel engages the seat track. In the deployed position, the indexing wheel rolls over the seat track to identify a proper position for the seat assembly in relation to the seat track. In at least one embodiment, the indexing wheel includes a first stop and a second stop. A rolling range of the indexing wheel is defined between the first stop and the second stop. The rolling range relates to a traversed area defining a proper position for the seat assembly. In at least one other embodiment, the indexing wheel includes a plurality of knobs that are radially spaced to fit into expanded openings of the seat track as the indexing wheel rolls over the seat track. As each knob passes into or out of an expanded opening, an audible click may be emitted. The audible click may be caused by an interference between the knob and the expanded opening. With each passage of a knob into and out of an expanded opening, an individual may be notified of an incremental movement of the seat assembly. For example, each passage (and/or audible click) may be associated with a one inch movement. In this manner, the rolling wheel provides indexing information (such as distance traveled) to an individual.

The indexing wheel allows for quick and easy positioning and repositioning of a seat assembly in relation to a seat track. For example, the number of knobs that engage expanded openings indicate to an individual how far the seat assembly has traveled. In this way, it can be known with relative ease when to lock the seat assembly onto the seat track.

In at least one embodiment, the seat assembly including the deployable indexing wheel may be used in conjunction with an augmented reality experience so that the actual seat assembly overlaps with a ghosted image of a virtual seat assembly in a desired location. In at least one embodiment, the indexing wheel may also include an odometer that automatically senses distance traveled.

Figure 1:
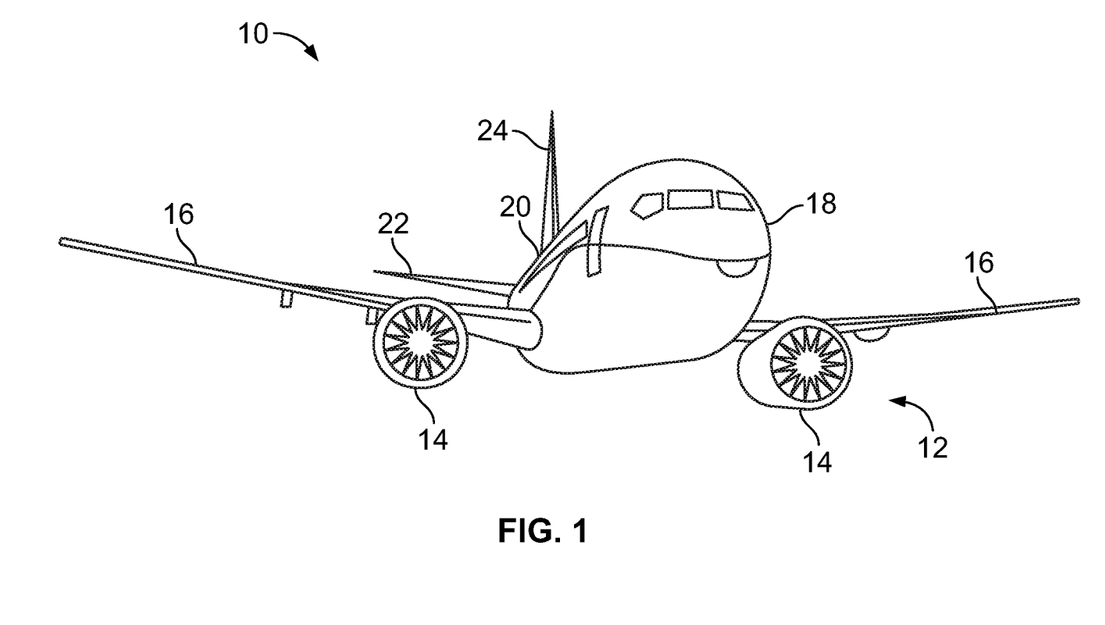
FIG. 1 illustrates a perspective front view of an aircraft, according to an embodiment of the present disclosure.

FIG. 1 illustrates a perspective top view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section in which an aft rest area assembly may be positioned. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
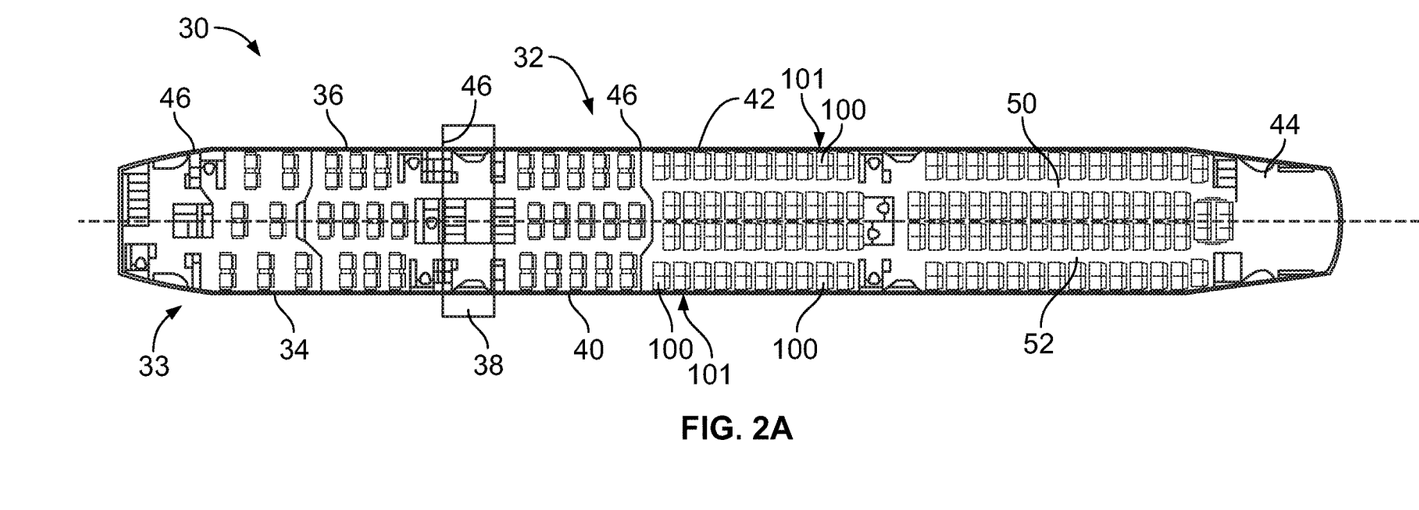
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Seat assemblies 100 are positioned throughout the internal cabin 30. The seat assemblies 100 may be arranged in rows 101.

Figure 2B:
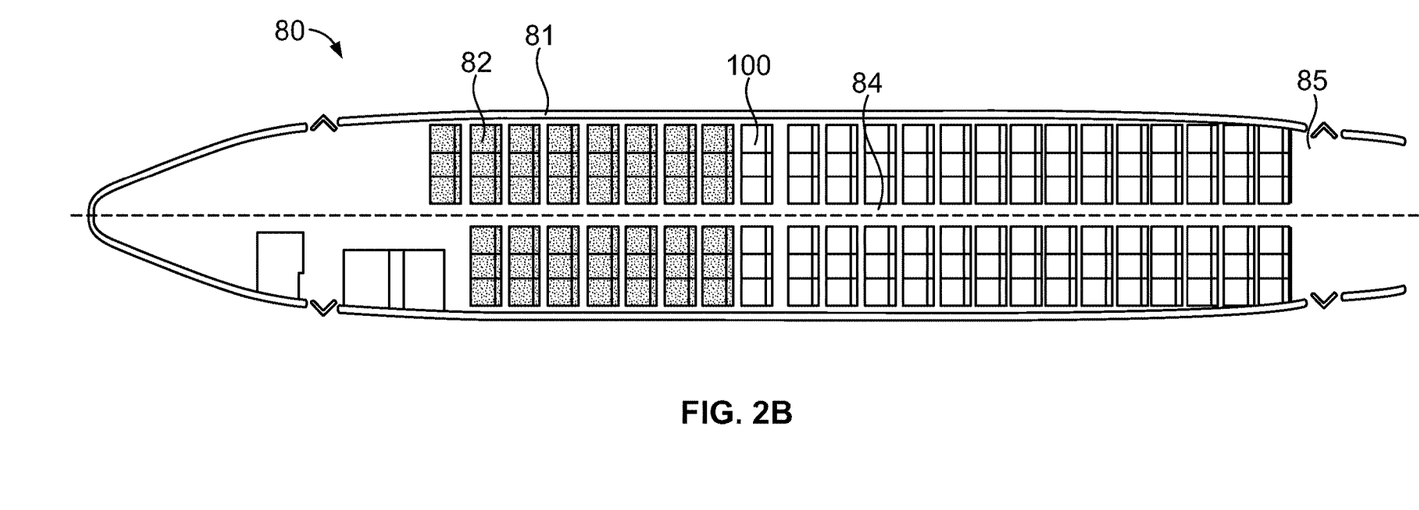
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies 100, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
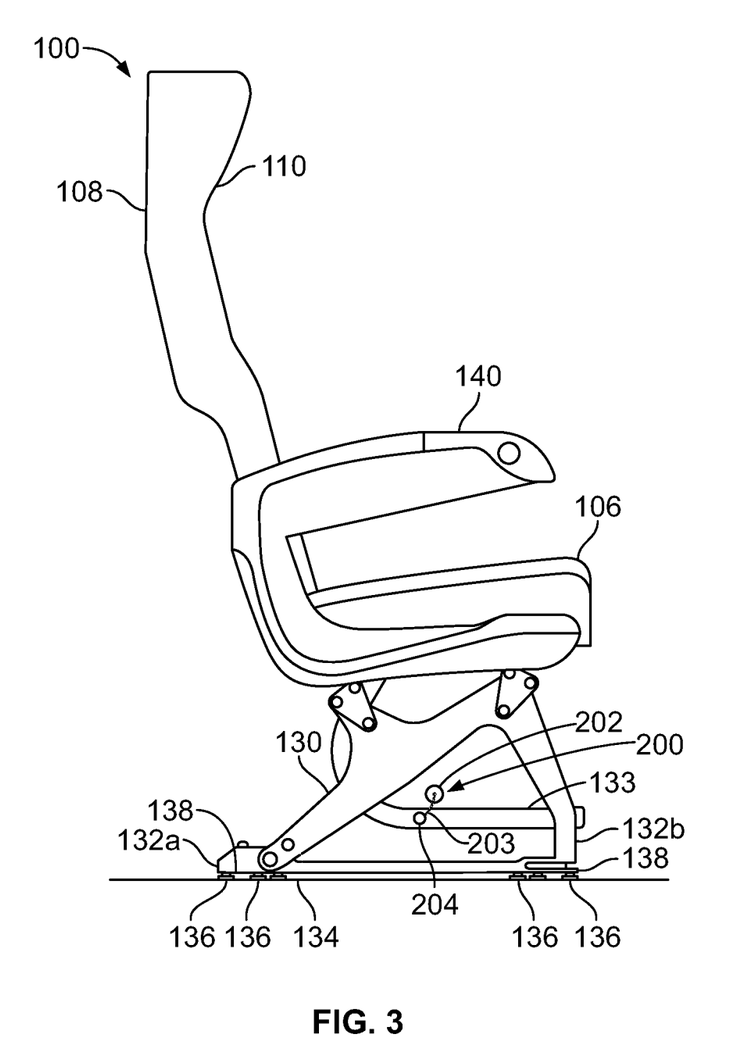
FIG. 3 illustrates a side view of a seat assembly, according to an embodiment of the present disclosure.

FIG. 3 illustrates a side view of a seat assembly 100, according to an embodiment of the present disclosure. The seat assembly 100 is configured to be secured within an internal cabin of a vehicle, such as a commercial aircraft.

The seat assembly 100 includes a base 130, which may include legs 132 (such as legs 132a and 132b) that may be secured to seat tracks 134 within a cabin of a vehicle. The legs 132 on a same side of the seat assembly 100 may be connected together by a spanner bar 133. In at least one embodiment, securing studs 136 (such as shear studs) downwardly extend from lower surfaces 138 of the legs 132. The securing studs 136 are securely retained within the seat tracks 134. The seat tracks 134 are configured to securely couple to the securing studs 136 to secure the seat assembly 100 in place. The base 130 supports a seat cushion 106 and a backrest 108, which includes a headrest 110. Arm rests 140 may be pivotally secured to the backrest 108.

The seat assembly 100 may be sized and shaped differently than shown in FIG. 3. The seat assembly 100 may include more or less components than shown in FIG. 3. It is to be understood that the seat assembly 100 shown in FIG. 3 is merely one example of a seat assembly that may be disposed within an internal cabin of a vehicle.

A seat indexing system 200 includes an indexing wheel 202 coupled to the seat assembly 100. As shown, the indexing wheel 202 couples to the spanner bar 133 through an extension arm 203 that pivotally couples to the spanner bar 133 via a pivot axle 204. As shown in FIG. 3, the indexing wheel 202 is in a stowed position, in which the indexing wheel 202 is disengaged from the seat track 134. Optionally, the indexing wheel 202 may couple to other portions of the seat assembly 100 other than the spanner bar 133. For example, the indexing wheel 202 may be coupled to a leg 132, an underside of the cushion 106, or the like. Additionally, the indexing wheel 202 may be coupled to the seat assembly 100 other than via the extension arm 203. For example, the indexing wheel 202 may be coupled to the seat assembly 100 through a retractable, articulating, and/or telescopic assembly.

Figure 4:
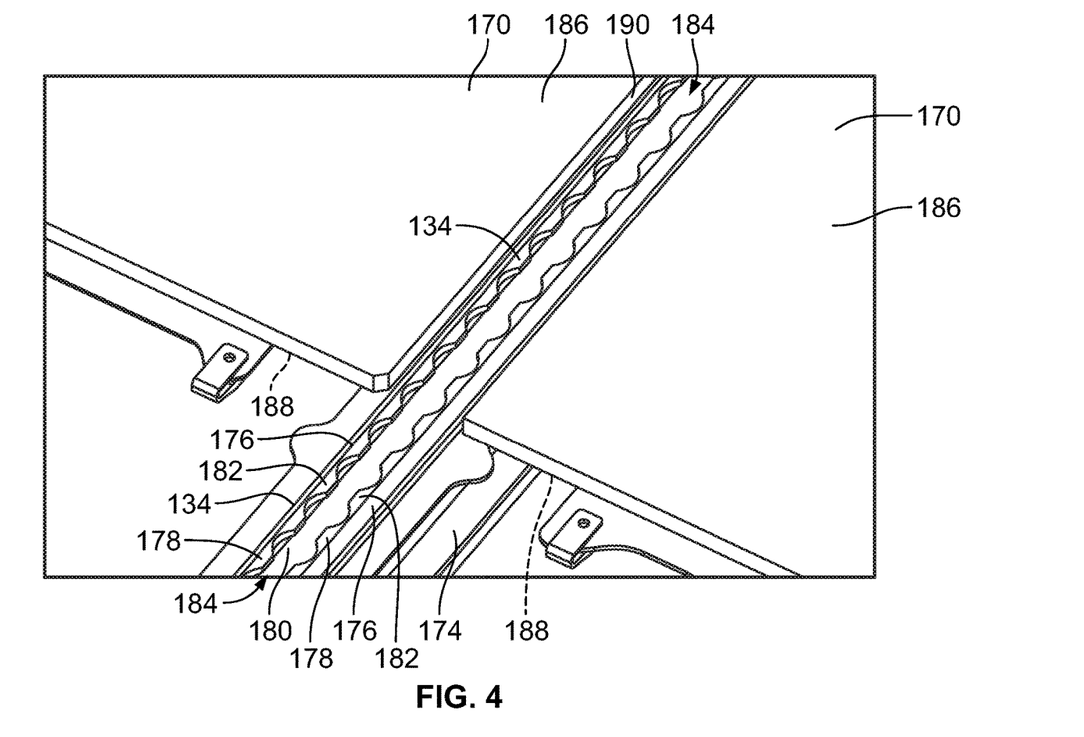
FIG. 4 illustrates a perspective top view of a seat track secured between floor panels, according to an embodiment of the present disclosure.

FIG. 4 illustrates a perspective top view of the seat track 134 secured between floor panels 170, according to an embodiment of the present disclosure. The seat track 134 includes a base 174 and lateral walls 176 extending upwardly from the base 174. A retaining lip 178 inwardly extends from a top end of each lateral wall 176, such as at a ninety-degree angle. The retaining lips 178 cooperate to form a series of expanded openings 180 and retaining arms 182 over a track channel 184. The expanded openings 180 and retaining arms 182 alternate over a length of the seat track 134. That is, two expanded openings 180 are separated by a retaining arm 182.

The floor panels 170 include upper planar support surfaces 186 opposite from lower surfaces 188. The upper planar surface surfaces 186 connect to the lower surfaces 188 at edges, such as interior edges 190.

Figure 5:
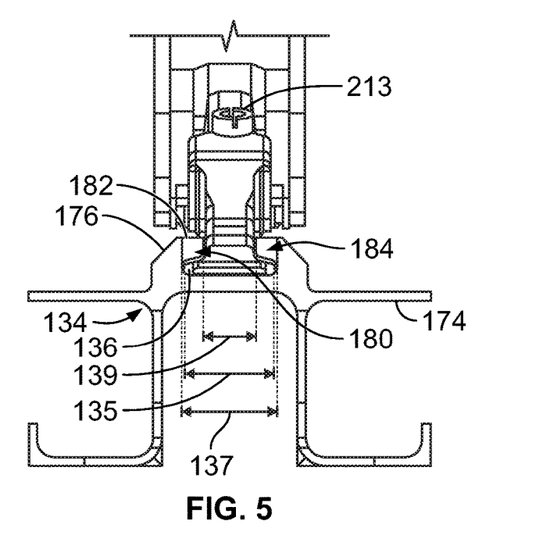
FIG. 5 illustrates an end view of a securing stud within a track channel of a seat track, according to an embodiment of the present disclosure.

FIG. 5 illustrates an end view of a securing stud 136 within a track channel 184 of a seat track 134, according to an embodiment of the present disclosure. Referring to FIGS. 3-5, the securing studs 136 of the seat assembly 100 may have a circular cross section and a width 135 that is less than a width 137 of the expanded openings 180. The width 135 is greater than a width 139 of the opening between opposed retaining arms 182. As such, when the securing studs 136 are positioned directly beneath the retaining arms 182, the securing studs 136 are locked in position, such that they are unable to eject through the opening between the retaining arms 182, thereby securely coupling the seat assembly 100 to the seat track 134. In contrast, when the securing studs 136 are shifted into the track channel 184 below or into the expanded openings 180, the securing studs 136, and therefore the legs 132 of the seat assembly 100, may be lifted out of the seat track 134.

In order to adjust the seat assembly 100 to a different longitudinal position, a lock fitting 213 (such as a bolt or other such fastener) is manipulated to unlock the legs 132. For example, the lock fitting 213 may be loosened such that a distal end no longer engages a portion of the seat track 134. Optionally, the seat assembly 100 may not include lock fittings.

After the lock fitting 213 disengages from the seat track 134, the seat assembly 100 may be longitudinally shifted in relation to the seat track 134. The seat assembly 100 is shifted so that the securing studs 136 are no longer underneath the retaining arms 182, but are instead within the expanded openings 180. After the securing studs 136 are in the expanded openings 180, the seat assembly 100 may be removed from the seat track 134, and/or moved to a different position on the seat track 134 via a seat adjustment system.

Figure 6:
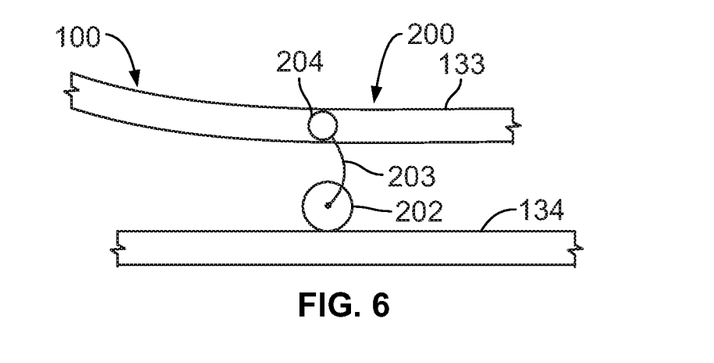
FIG. 6 illustrates a lateral view of the indexing wheel in a deployed position in relation to the seat track, according to an embodiment of the present disclosure.

FIG. 6 illustrates a lateral view of the indexing wheel 202 in a deployed position in relation to the seat track 134, according to an embodiment of the present disclosure. Referring to FIGS. 3-6, after the securing studs 136 have been removed from the seat track 134, the indexing wheel 202 is pivoted downwardly onto the seat track 134, so that the indexing wheel 202 is rotatably supported on the seat track 134. As such, the indexing wheel 202 allows for smooth, rolling movement as the seat assembly 100 is moved along the seat track 134 to a different position.

The indexing wheel 202 is configured to be moved between the stowed position (as shown in FIG. 3), in which the indexing wheel 202 is disengaged from the seat track 134, and the deployed position (as shown in FIG. 6), in which the indexing wheel 202 engages the seat track 134. In the deployed position, the indexing wheel 202 rolls over the seat track to identify a proper, desired position for the seat assembly 100 in relation to the seat track.

In at least one embodiment, the indexing wheel 202 is configured to provide indexing of the seat assembly 100 in relation to the seat track 134, as well as provide an aid for movement of the seat assembly 100 on the seat track 134. That is, the indexing wheel 202 provides smooth, rolling movement on the seat track 134, thereby reducing the need for an individual to remove the seat assembly 100 from the seat track 134 when the seat assembly 100 is moved to a different position on the seat track 134. As such, the indexing wheel 202 bears at least a portion of the weight of the seat assembly 100 during movement to a different position, thereby reducing stress on a mechanic moving the seat assembly 100.

Figure 7:
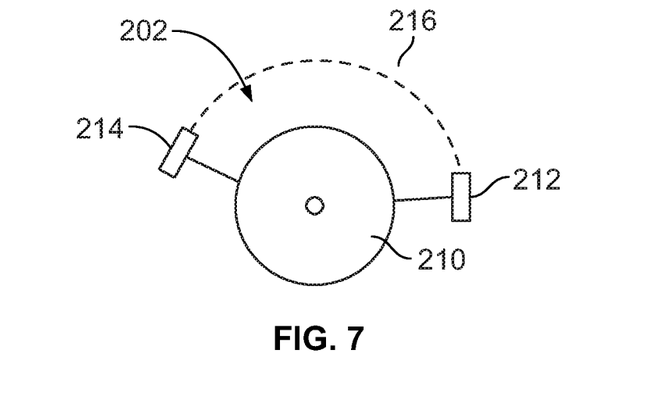
FIG. 7 illustrates a front view of the indexing wheel, according to an embodiment of the present disclosure.

FIG. 7 illustrates a front view of the indexing wheel 202, according to an embodiment of the present disclosure. In at least one embodiment, the indexing wheel 202 includes a wheel body 210, a first stop 212 radially extending from the wheel body 210, and a second stop 214 radially extending from the wheel body 210. The first stop 212 and the second stop 214 are protuberances, such as beams, posts, spokes, blocks, or the like, which radially extend from the wheel body 210.

Referring to FIGS. 3-7, a rolling range 216 of the indexing wheel 202 is defined between the first stop 212 and the second stop 214. The rolling range 216 relates to a traversed area over the seat track 134 defining a proper position for the seat assembly.

Figure 8:
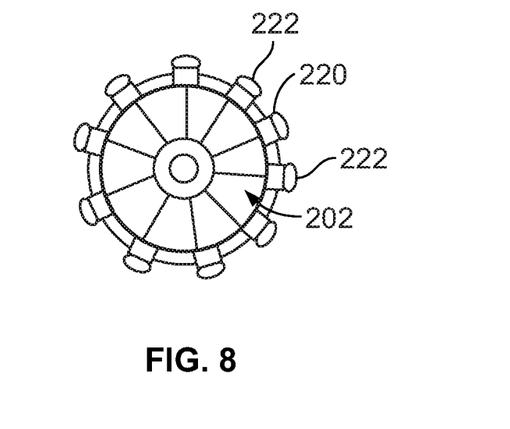
FIG. 8 illustrates a perspective front view of the indexing wheel, according to an embodiment of the present disclosure.

FIG. 8 illustrates a perspective front view of the indexing wheel 202, according to an embodiment of the present disclosure. In at least one other embodiment, the indexing wheel 202 includes a main wheel body 220 and a plurality of knobs 222 radially extending from the wheel body 220. Referring to FIGS. 3-6 and 8, the knobs are radially spaced to fit into the expanded openings 180 of the seat track 134 as the indexing wheel 202 rolls over the seat track 134. The knobs 222 may be positioned around a circumference of the main wheel body 220. Optionally, the knobs 222 may be positioned around a portion of the circumference of the main wheel body 220, in order to provide an additional indexing aid, as described with respect to FIG. 10.

Figure 9:
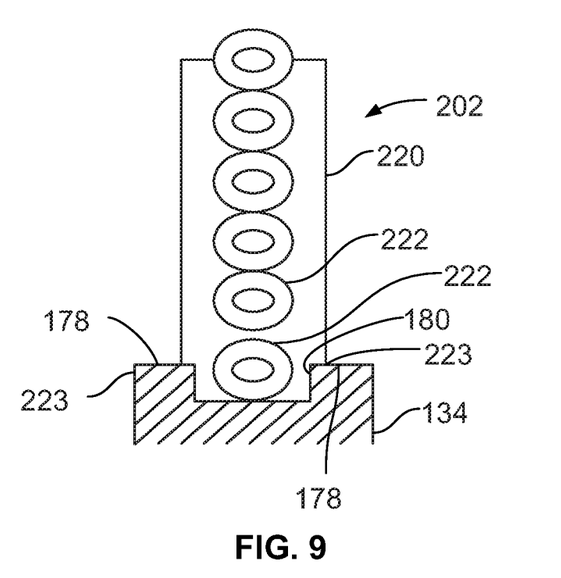
FIG. 9 illustrates an end view of the indexing wheel in the deployed position, according to an embodiment of the present disclosure.

FIG. 9 illustrates an end view of the indexing wheel 202 in the deployed position, according to an embodiment of the present disclosure. Referring to FIGS. 3-6, 8, and 9, as shown, the knobs 222 are configured to pass into the expanded openings 180 of the seat track 134. Lateral edges 223 of the wheel body 220 roll over top surfaces of the retaining lips 178. As each knob 222 passes into or out of an expanded opening 180, an audible click may be emitted. The audible click may be caused by an interference between the knobs 222 and the expanded openings 180. For example, each knob 222 may be formed of a material, coated with a substance, and/or include a structure (such as a moveable, spring-biased button) that emits a click as it frictionally engages edges of the seat track 134 that define the expanded openings 180. With each passage of a knob 222 into and out of an expanded opening 180, an individual may be notified of an incremental movement of the seat assembly 100. For example, each passage (and/or audible click) may be associated with a one inch movement. In this manner, the rolling indexing wheel 202 provides indexing information (such as distance traveled) to an individual.

Figure 10:
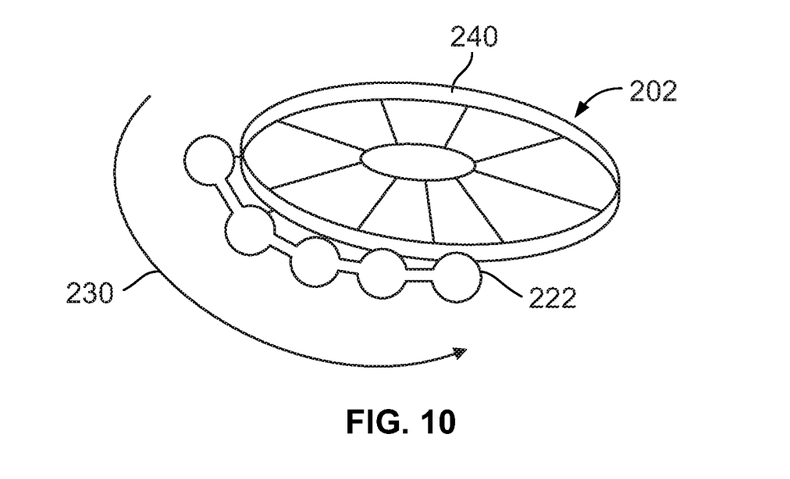
FIG. 10 illustrates a perspective view of the indexing wheel, according to an embodiment of the present disclosure.

FIG. 10 illustrates a perspective view of the indexing wheel 202, according to an embodiment of the present disclosure. The indexing wheel 202 includes knobs 222, as described above, over a positioning range 230, which relates to a traversed area over the seat track 134 (shown in FIGS. 3-6) defining a proper position for the seat assembly 100, thereby providing a readily apparent indexing aid. As shown, the positioning range 230 may be defined by a plurality of knobs 222. A smooth rim 240 is outside of the positioning range 230.

Figure 11:
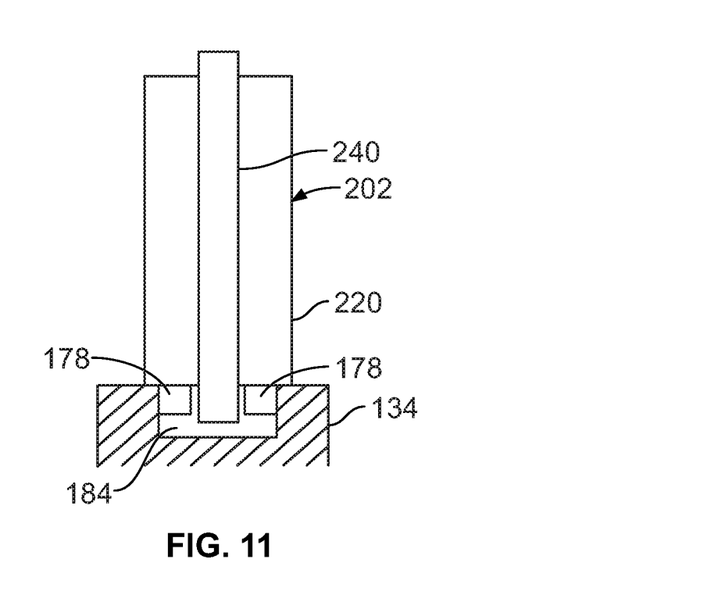
FIG. 11 illustrates an end view of a smooth rim of the indexing wheel in a track channel of the seat track, according to an embodiment of the present disclosure.

FIG. 11 illustrates an end view of the smooth rim 240 of the indexing wheel 202 in the track channel 184 of the seat track 134, according to an embodiment of the present disclosure. The smooth rim 240 extends into the track channel 184, between the opposed retaining lips 178 to ensure that the indexing wheel 202 remains engaged with the seat track 134, even when the indexing wheel is rolling outside of the positioning range 230 (shown in FIG. 10).

Referring to FIGS. 9-11, by rolling the indexing wheel 202 over the positioning range 230 defined by the plurality knobs 222, an individual is informed of a proper position for the seat assembly 100 with respect to the seat track 134. That is, the positioning range 230 indicates a start point and an end point for the proper position for the seat assembly 100 on the seat track 134. If the indexing wheel 202 continues to roll on the seat track 134 such that the smooth rim 240 enters the track channel 184, the seat assembly 100 is outside of the proper position.

Figure 12:
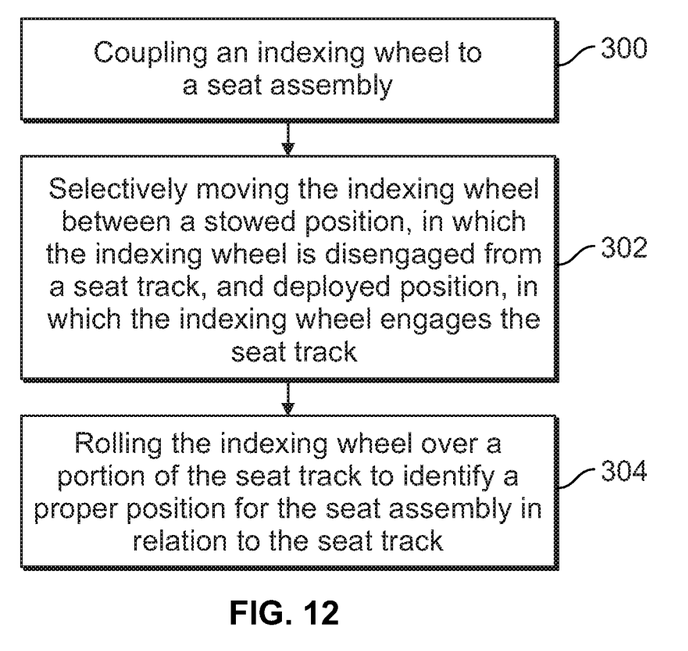
FIG. 12 illustrates a flow chart of a seat indexing method, according to an embodiment of the present disclosure.

FIG. 12 illustrates a flow chart of a seat indexing method, according to an embodiment of the present disclosure. The seat indexing method includes coupling, at 300, an indexing wheel to a seat assembly, and selectively moving, at 302, the indexing wheel between a stowed position, in which the indexing wheel is disengaged from a seat track, and a deployed position, in which the indexing wheel engages the seat track. The seat indexing method also includes rolling, at 304, the indexing wheel over a portion of the seat track to identify a proper position for the seat assembly in relation to the seat track.

The coupling may include coupling the indexing wheel to the seat assembly through an extension arm that is pivotally connected to the seat assembly by a pivot axle.

In at least one embodiment, the seat indexing method includes providing the indexing wheel with a first stop and a second stop that radially extend from a wheel body. The seat indexing method may also include defining a rolling range of the indexing wheel between the first stop and the second stop. The seat indexing method may also include relating the rolling range to a traversed area over the seat track defining a proper position for the seat assembly.

In at least one embodiment, the seat indexing method includes providing the indexing wheel with a plurality of knobs that radially extend from a wheel body, wherein the plurality of knobs are radially spaced to fit into expanded openings of the seat track as the indexing wheel rolls over the seat track. The seat indexing method may also include emitting an audible click as each of the plurality of knobs passes into or out of one of the expanded openings. The seat indexing method may also include defining a positioning range with the plurality of knobs. The seat indexing method may also include providing a smooth rim outside of the positioning range.

As explained herein, embodiments of the present disclosure provide an efficient systems and methods for identifying proper locations for seats within an internal cabin of a vehicle. Further, embodiments of the present disclosure provide systems and methods that allow for quick and efficient adjustment of seats within an internal cabin.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat indexing system for an internal cabin of an aircraft, the seat indexing system comprising:
    a seat assembly; and
    an indexing wheel coupled to the seat assembly, wherein the indexing wheel is configured to be moved between a stowed position, in which the indexing wheel is disengaged from a seat track that extends between multiple rows of seats of the aircraft, and a deployed position, in which the indexing wheel engages the seat track, wherein the indexing wheel comprises:
        a wheel body;
        a first stop radially extending from the wheel body; and
        a second stop radially extending from the wheel body.

2. The seat indexing system of claim 1, wherein the indexing wheel is configured to roll over a portion of the seat track to identify a proper position for the seat assembly in relation to the seat track.

3. The seat indexing system of claim 1, wherein the indexing wheel provides an aid for movement of the seat assembly on the seat track.

4. The seat indexing system of claim 1, wherein the indexing wheel couples to the seat assembly through an extension arm that is pivotally connected to the seat assembly by a pivot axle.

5. The seat indexing system of claim 1, wherein a rolling range of the indexing wheel is defined between the first stop and the second stop.

6. The seat indexing system of claim 5, wherein the rolling range relates to a traversed area defining a proper position for the seat assembly.

7. A seat indexing method for an internal cabin of an aircraft, the seat indexing method comprising:
    coupling an indexing wheel to a seat assembly;
    selectively moving the indexing wheel between a stowed position, in which the indexing wheel is disengaged from a seat track that extends between multiple rows of seats within the internal cabin of the aircraft, and a deployed position, in which the indexing wheel engages the seat track; and
    providing the indexing wheel with a first stop and a second stop that radially extend from a wheel body.

8. The seat indexing method of claim 7, further comprising rolling the indexing wheel over a portion of the seat track to identify a proper position for the seat assembly in relation to the seat track.

9. The seat indexing method of claim 7, wherein the coupling comprises coupling indexing wheel to the seat assembly through an extension arm that is pivotally connected to the seat assembly by a pivot axle.

10. The seat indexing method of claim 7, further comprising defining a rolling range of the indexing wheel between the first stop and the second stop.

11. The seat indexing method of claim 10, further comprising relating the rolling range to a traversed area defining a proper position for the seat assembly.

12. A seat indexing system for an internal cabin of a vehicle, the seat indexing system comprising:
    a seat assembly; and
    an indexing wheel coupled to the seat assembly, wherein the indexing wheel is configured to be moved between a stowed position, in which the indexing wheel is disengaged from a seat track, and a deployed position, in which the indexing wheel engages the seat track, wherein the indexing wheel comprises:
        a wheel body;
        a first stop radially extending from the wheel body; and
        a second stop radially extending from the wheel body.

13. The seat indexing system of claim 12, wherein the indexing wheel is configured to roll over a portion of the seat track to identify a proper position for the seat assembly in relation to the seat track.

14. The seat indexing system of claim 12, wherein the indexing wheel provides an aid for movement of the seat assembly on the seat track.

15. The seat indexing system of claim 12, wherein the indexing wheel couples to the seat assembly through an extension arm that is pivotally connected to the seat assembly by a pivot axle.

16. The seat indexing system of claim 12, wherein a rolling range of the indexing wheel is defined between the first stop and the second stop.

17. The seat indexing system of claim 16, wherein the rolling range relates to a traversed area defining a proper position for the seat assembly.

18. The seat indexing system of claim 12, wherein the vehicle is an aircraft.

19. The seat indexing system of claim 12, wherein the vehicle is one of an automobile or bus.

20. The seat indexing system of claim 12, wherein the vehicle is one of a locomotive, train car, seacraft, or spacecraft.

\* \* \* \* \*